United States Patent
Song et al.

(10) Patent No.: US 7,450,515 B2
(45) Date of Patent: Nov. 11, 2008

(54) GEM OAM FRAME TRANSMISSION METHOD IN GIGABIT-CAPABLE PASSIVE OPTICAL NETWORK

(75) Inventors: Jae-Yeon Song, Seongnam-si (KR); Se-Youn Lim, Seoul (KR); Jin-Hee Kim, Suwon-si (KR); Seo-Won Kwon, Suwon-si (KR); Yoon-Sun Lee, Seoul (KR); Jong-Hwa Lee, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 703 days.

(21) Appl. No.: 10/818,209

(22) Filed: Apr. 5, 2004

(65) Prior Publication Data

US 2004/0218534 A1    Nov. 4, 2004

(30) Foreign Application Priority Data

Apr. 30, 2003    (KR) ...................... 10-2003-0027640

(51) Int. Cl.
*H04L 12/26* (2006.01)
(52) U.S. Cl. .................... 370/236.2; 370/235; 370/389
(58) Field of Classification Search ............... 370/395.1
See application file for complete search history.

(56) References Cited

U.S. PATENT DOCUMENTS 6,023,467 A * 2/2000 Abdelhamid et al. ..... 370/236.2

OTHER PUBLICATIONS

B-ISDN operation and meintenance principles and fucntions, ITU-T Recommendation I.610, International Telecommunication Union, Feb. 1999.*
Gigabit-capable Passive Optical Networks (GPON): General characteristics, ITU-T Recommendation G.984.1, International Telecommunication Union, Mar. 2003.*

* cited by examiner

*Primary Examiner*—Chau Nguyen
*Assistant Examiner*—Louis Bell
(74) *Attorney, Agent, or Firm*—Cha & Reiter, LLC

(57) ABSTRACT

A GEM OAM frame transmission method used in a Gigabit-capable passive optical network is provided. The method defines an OAM frame structure in a GEM mode of the Gigabit-capable passive optical network and enables an OAM to be achieved even when the GEM mode is operated. The method comprises the steps of: constructing a GEM OAM frame including a GEM header field and a GEM payload field, the GEM header field containing OAM representation information indicating that the GEM OAM frame contains the OAM information, the GEM payload field containing the OAM information; and transmitting the constructed GEM OAM frame in order to enable the ONU/ONT to perform an operation according to the OAM information.

15 Claims, 6 Drawing Sheets

GEM OAM FRAME TRANSMISSION METHOD IN GIGABIT-CAPABLE PASSIVE OPTICAL NETWORK

CLAIM OF PRIORITY

This application claims priority to an application entitled "GEM OAM frame transmission method in Gigabit-capable passive optical network," filed in the Korean Intellectual Property Office on Apr. 30, 2003 and assigned Ser. No. 2003-27640, the contents of which are hereby incorporated by reference.

BACKGROUND OF THE INVENTION

1. Field of the Invention

The present invention relates to a Gigabit-capable passive optical network (hereinafter, referred to as GPON).

2. Description of the Related Art

To construct a subscriber network from a telephone office to a building or a residential house, various network structures and progress schemes have been proposed, such as an x-digital subscriber line (XDSL), a hybrid fiber coax (HFC), a fiber to the building (FTTB), a fiber to the curb (FTTC), or a fiber to the home (FTTH). Among these structures, an FTTx (x represents B, C, or H) structure may be classified into an active FTTx structure having an active optical network (hereinafter, referred to as AON) and a passive FTTx structure having a passive optical network (hereinafter, referred to as a PON).

The PON has a point-to-multipoint topology using passive elements and considered an economical scheme for building a subscriber network. That is, in the PON, one optical line termination (hereinafter, referred to as an OLT) is connected to a plurality of optical network units (hereinafter, referred to as ONUs) by means of an optical distribution network (hereinafter, referred to as an ODN) of 1×N, so that a distributed topology with a tree structure can be formed.

A first type of PON developed and standardized was an asynchronous transfer mode passive optical network (hereinafter, referred to as an ATM-PON). The standardization contents are disclosed in the international telecommunication union's telecommunication section (hereinafter, referred to as an ITU-T) G.982, ITU-T G.983.1 and ITU-T G.983.3 drawn up by the ITU-T. Currently, a GPON standardization is being developed by the ITU-T.

FIG. 1 is a block diagram of a conventional PON having a single OLT and a plurality of ONUs. In particular, FIG. 1 shows an example in which one OLT 10 is connected to three ONUs 12a to 12c through an ODN 16.

As shown, the OLT 10 is located at the root of tree structure and plays a central role in providing information to subscribers in an access network. This OLT 10 is connected to the ODN 16. Herein, the ODN 16 has a tree topology structure and distributes a downstream data frame, which is transmitted from the OLT 10, to the ONUs 12a to 12c. The ODN 16 multiplexes upstream data frames from the ONUs 12a to 12c and transmits the multiplexed frame to the OLT 10. Also, the ONUs 12a to 12c receives the downstream data frame and provides it to end users 14a to 14c. Also, it transmits data, which are outputted from the end users 14a to 14c, to the OLT 10 through the ODN 16 as upstream data frames. In the drawing, each of the end users 14a to 14c connected to the each of the ONUs 12a to 12c represents different kinds of terminating equipments used in a subscriber network having a PON and network terminals (NTs).

Generally, in an ATM-PON, ATM cells having 53 bytes are transmitted upward or downward in the form of frames, each consisting of a predetermined number of ATM cells. In a tree type PON structure as shown in FIG. 1, the OLT 10 inserts downstream cells in a downstream frame, and then the downstream cells are distributed to each of the ONUs 12a to 12c. In the case of upstream transmission, the OLT 10 accesses data, which are transmitted from the ONUs 12a to 12c, by means of a time division multiplexing (TDM) scheme. Herein, since the ODN 16, which is connected between the OLT 10 and the ONUs 12a to 12c, is a passive device, the OLT 10 prevents data from colliding in the ODN 16 by means of a virtual distance correction algorithm called "ranging". When downstream data transmission is performed from the OLT 10 to the ONUs 12a to 12c, the OLT 10 and the ONUs 12a to 12c can send or receive from each other a code key for an encryption as well as operations, administration and maintenance (hereinafter, referred to as an OAM) message for maintenance and security. For this purpose, each frame in upstream or downstream transmission has a corresponding data field in a dedicated ATM cell or a general ATM cell, by which a message can be sent or received at predetermined intervals.

A GPON simultaneously supports not only a cell-based transmission method (that is, ATM mode) processing an ATM service, but also a GPON encapsulation method (that is, a GEM mode) processing packets having variable lengths. These method are similar to a time division multiplex (TDM) and an Ethernet service, but different from a broadband passive optical network (BPON), which is based on the G.983 series standardized as described above and operates on the basis of an ATM. The ATM mode, transmission data are fitted to a GTC frame by the unit of a cell and then transmitted. In the GEM mode, transmission data a refitted to a GTC frame by a unit of a single GEM frame and then transmitted.

FIG. 2 is a diagram showing the protocol stack structure of a conventional GPON. As shown, the protocol stack of the GPON includes a protocol layer 100 which interfaces with an upper layer, a GTC layer 200, and a GPON physical media dependent (GPM) layer 300. The protocol layer 100 includes an ATM client 110, an ONT (optical network terminal) management control interface (hereinafter, referred to as an OMCI) 120, a GEM client 130, and a physical layer operation administration maintenance (PLOAM) module 140.

In the GPON protocol having this structure, the GTC layer 200 operates to convert upper frames into a GTC frame and then transmits the converted frame. The ATM client 110 supports a transmission method of an ATM mode, and the GEM client 130 supports a transmission method of a GEM mode.

In the ATM mode, the ATM client 110 inserts transmission data in the GTC frame in the unit of a cell having a fixed length. If the transmission data exceeds the GTC cell (typically, 53 bytes), the ATM client 110 inserts the remaining transmission data in the next frame for transmission. Accordingly, a cell is not divided in the ATM mode.

However, since a GEM frame is a packet having a variable length, when the GEM client 130 fits the GEM frame to the GTC frame, the GEM client 130 may divide the GEM frame and then transmits the divided frame for the bandwidth efficiency.

For instance, when the GEM client 130 receives user data from an upper layer, the GEM client 130 receives information (e.g. length) about the GTC frame from the GTC layer 200, then divides the user data on the basis of the information and generates a plurality of GEM frames. Otherwise, the GEM client 130 one GEM frame and then transmits the GEM frame to the GTC layer 200. Thereafter, the GTC layer 200 fits the GEM frame to a GTC frame, which is standing by, and transmits the frame. At the receiving end, a reassembly of the divided GEM frame in the GTC layer 200 is performed for a subsequent transmission to an upper layer.

In the conventional art, an ONT management control protocol is provided for a BPON and operates on the basis of an ATM protocol as defined by the G.983.1. Further, the G.983.2 defines an ONT management control interface of the BPON and defines an ATM cell-based frame structure for the transmission of management control information.

FIG. 3 is a diagram showing the structure of a frame in a conventional GEM mode supporting a TDM and an Ethernet service. As shown, the GEM frame generally includes a payload length identifier (hereinafter, referred to as a PLI)(L) (16 bits) 310, a Port ID (12 bits) 320, a flag (two bits) 330, a FFS (two bits) 340, a HEC (16 bits) 350, and a fragment payload (L byte) 360. The PLI 310, the Port ID 320, the flag 330, the FFS 340, and the HEC 350 are included in a GEM header.

The PLI 310 is a field for representing the length of a payload, and the Port ID 320 is a field representing IDs for differentiating traffics from each other in order to provide the traffic multiplexing. Further, the Flag 330 is a field for representing the division state of a payload, and the HEC 350 is a field for detecting and correcting a header error. The FFS 340 is an undecided field.

In the prior art, the two bits of the Flag 330 from the GEM frame header shows whether or not a currently transmitted GEM payload is a divided frame. For instance, the Flag 330 in an undivided GEM frame may be set as "11", the Flag 330 in the start frame of a divided GEM frame may be set as "10", the Flag 330 in a medium frame of the divided GEM frame may be set as "00", and the Flag 330 in the last frame of the divided GEM frame may be set as "01". As such, whether or not a predetermined GEM frame is a divided frame, or one of the divided frames which corresponds to the predetermined GEM frame, can be indicated.

FIG. 4 is a diagram showing the structure of a conventional ATM-OAM cell.

As shown, the conventional ATM-OAM cell includes 5 bytes header and 48 bytes OAM cell information field. In particular, the OAM cell information field includes 4 bits OAM type field 402, 4 bits function type field 403, 45 bytes function specific field 404, 6 bits reserved field 405, and 10 bits CRC field 406.

The 5 bytes header includes a Generic Flow Control (GFC, not used in a case of an empty cell) for representing an unassigned cell, a Virtual Path Identifier (VPI)/a Virtual Channel Identifier (VCI) for representing a path, a Payload Type (PT) for representing an information type of a payload, a Cell Loss Priority Field (CLP) for representing the priority of a call, and a Header Error Control (HEC) for controlling an error of a header.

The 4 bits OAM type field 402 and the 4 bits function type field 403 are shown in table 1.

TABLE 1

| OAM type | Coding | Function type | Coding |
|---|---|---|---|
| Fault management | 0001 | AIS | 0000 |
| | | RDI | 0001 |
| | | CC | 0100 |
| | | LB | 1000 |
| Performance management | 0100 | FPM | 0000 |
| | | BR (Backward Reporting) | 0001 |
| APS coordination protocol | 0101 | Group Protection | 0000 |
| | | Individual Protection | 0001 |

TABLE 1-continued

| OAM type | Coding | Function type | Coding |
|---|---|---|---|
| Activation/Deactivation | 1000 | FPM and associated BR | 0000 |
| | | CC | 0001 |
| | | FPM | 0010 |
| System management | 1111 | (Note) | (Note) |

NOTE-not to be standardized by this Recommendation

The 4 bits OAM type represents the OAM types, such as fault management, a performance management, APS (ATM protection switching) coordination protocol, activation/deactivation, and system management. The function types according to the OAM types may be classified into a fault management, which includes Alarm Indication Signal (hereinafter, referred to as an AIS), Remote Defect Indication (hereinafter, referred to as an RDI), Continuity Check (hereinafter, referred to as a CC), Loop Back (hereinafter, referred to as an LB); a performance management, which includes Forward Performance Monitoring (FPM) and Backward Reporting (BR); an APS coordination protocol, which includes Group Protection and Individual Protection; and an activation/deactivation having the FPM and associated the BR, CC, and FPM.

The function according to the fault management from is as follows. The AIS is an alarm signal transmitted from a switch, which detects an initial malfunction, to a destination terminal. The terminal receiving the alarm transmits the RDI to a transmission-side terminal of the cell so as to report transmission fault. That is, a network detects a fault in the connection path between two terminals through the alarm signal, and makes a detour or tries a reconnection.

Further, the CC is transmitted when a circuit is opened or when detecting whether or not a connection is normal. This function may b e performed while a service is being provided, and is also known as a "Keep Alive" function. The LB has the same function as that of the CC, but can designate a desired loop back point. Further, the LB makes it easy to track an abnormal section by determining whether or not the cell is returned. Further, detailed operations of function types in the function type field are defined in the function specific field 404 having a value of 45 bytes.

As described above, the GPON standardization is being developed by the ITU-T. The GPON simultaneously supports the GEM method as well as the cell-based transmission method processing the ATM service. This is different from the BPON that is based on the G.983 series standardized as described earlier. The GEM processes packets having variable lengths that is similar to a time division multiplex (TDM) and an Ethernet service.

Accordingly, in the ATM mode of the GPON, data are fitted to a GTC frame in the unit of a cell and then transmitted. Further, in the GEM mode of the GPON, data are fitted to a GTC frame in the unit of a GEM frame and transmitted. Thus, the standardization for an operation of the ATM mode is being developed on the basis of an operation of an ITU-T I.610 ATM or an ITU-T G.983.1 ATM PON. However, in a case of the GEM mode, detailed standardization supported by the GPON is still being developed.

Note that in a case of an OAM function supported by the ATM, as defined by the ITU-T I.610, an OAM flow from an F1 to an F5 is defined by each layer according to a loop-backed point. Particularly, the kinds of the OAM functions are shown by values of the VPI or VCI predetermined according to a F4 flow and a F5 flow, so that a cell has detailed VPI or VCI. Therefore, this cell may be differentiated from other cells. In addition, since the state of a corresponding payload can be shown by the PT of the header, the cell may be more easily differentiated from other cells.

The current standardization trend is that an operation procedure of a GEM OAM in an ITU-T SG15, which is a standard for the GPON, conforms to the OAM of the ATM. Accordingly, in a case of the ATM mode, an existence or absence of an OAM frame and the destination of the OAM frame may be expressed by means of the VPI, VCI, and PT in the ATM header, and pre-assigned values may be used as the values of the VPI, VCI, and PT.

However, in a case of the GEM mode, since only one "port_ID" field exists in the header, an existence or absence of an OAM frame (kinds of frame) and the destination (port) of the OAM frame must be expressed by means of the "port_ID" field. Currently, in the OAM frame in the current GEM mode, a detailed operation and a frame structure of the OAM frame have not been defined yet. Namely, a frame format for supporting the OAM in the GEM mode have not been proposed yet.

SUMMARY OF THE INVENTION

Accordingly, the present invention provides a protocol for transmitting a GEM OAM frame in a Gigabit-capable passive optical network, which defines an OAM frame structure in a GEM mode of the Gigabit-capable passive optical network so that an OAM can achieved even in the GEM mode.

According to one embodiment of the present invention, a method of transmitting OAM information from an OLT to an ONU/ONT in a GEM mode of a Gigabit-capable passive optical network is provided. The method includes the steps of: constructing a GEM OAM frame having a GEM header field and a GEM payload field, the GEM header field containing OAM representation information indicating that the GEM OAM frame contains the OAM information, the GEM payload field containing the OAM information; and transmitting the constructed GEM OAM frame to enable the ONU/ONT to perform an operation according to the OAM information.

According to another embodiment of the present invention, a method of transmitting OAM information from an OLT to an ONU/ONT in a GEM mode in a Gigabit-capable passive optical network is provided. The method includes the steps of: constructing a GEM OAM frame having a GEM header field and a GEM payload field, the GEM payload field containing OAM representation information and the OAM information, the OAM representation information indicating that the GEM OAM frame contains the OAM information; and transmitting the constructed GEM OAM frame to enable the ONU/ONT to perform an operation according to the OAM information.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
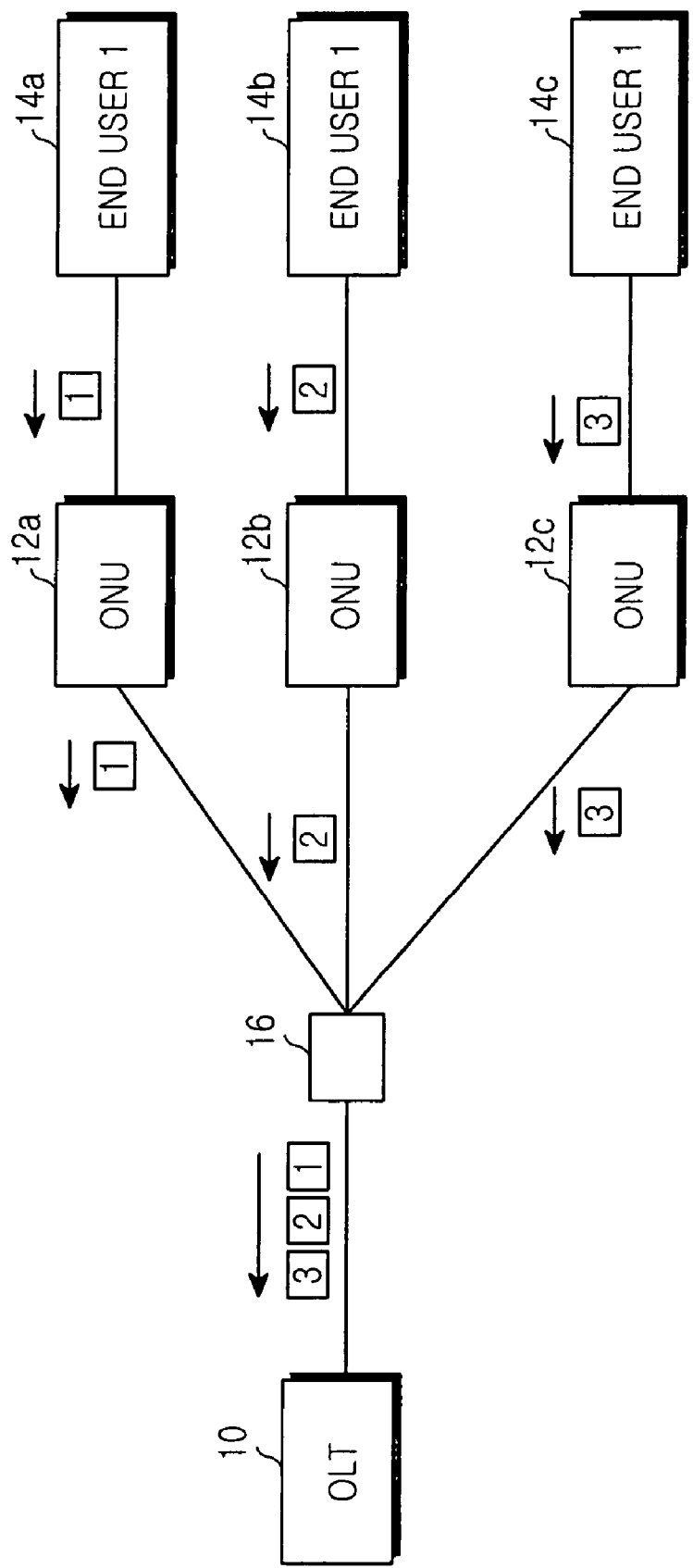
FIG. 1 is a block diagram of a conventional PON.
Figure 2:
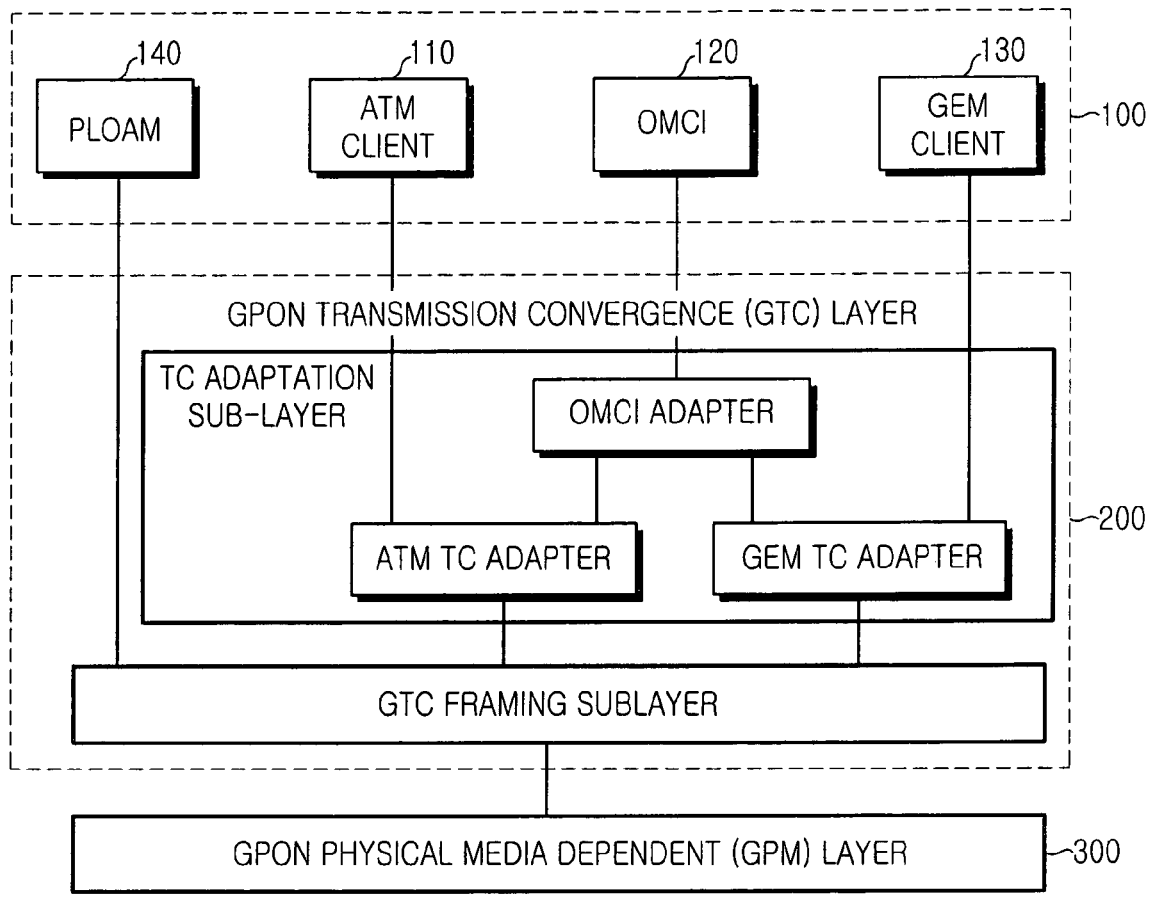
FIG. 2 is a diagram showing the protocol stack structure of a conventional GPON.
Figure 3:
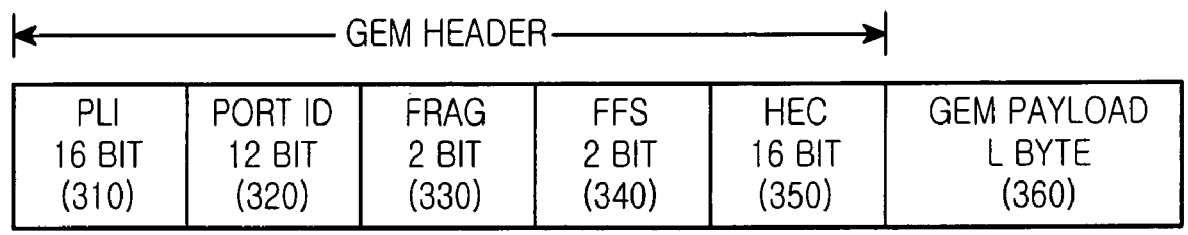
FIG. 3 is a diagram showing the structure of a frame in a conventional GEM mode supporting a TDM and an Ethernet service.
Figure 4:
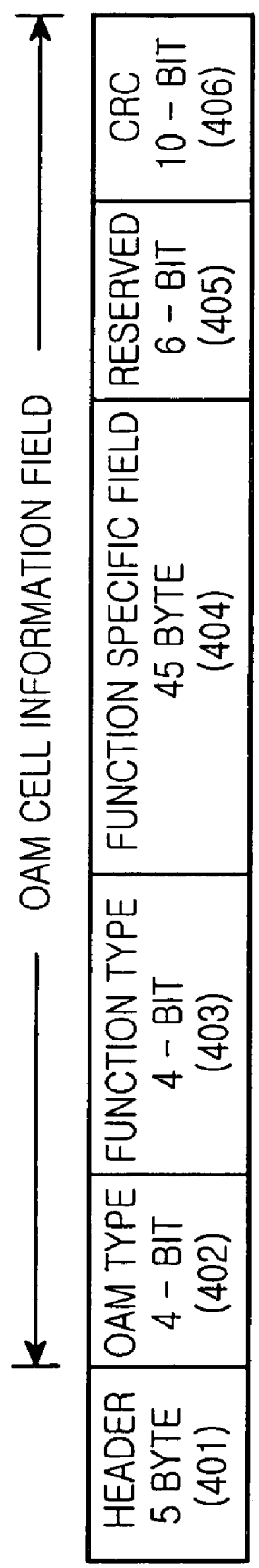
FIG. 4 is a diagram showing the structure of a conventional ATM-OAM cell.

Hereinafter, a preferred embodiment according to the present invention will be described with reference to the accompanying drawings. The same reference numerals and marks are used to designate the same elements as those shown in other drawings. For the purposes of clarity and simplicity, a detailed description of known functions and configuration incorporated herein will be omitted as it may make the subject matter of the present invention unclear.

Figure 5:
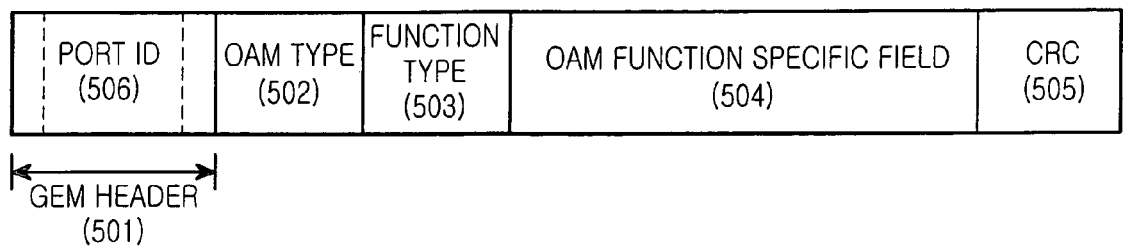
FIG. 5 is a diagram defining the structure of an OAM frame in a GEM mode of a GPON according to a first embodiment of the present invention.

FIG. 5 is a diagram defining the structure of an OAM frame that may be used during a GEM mode of a Gigabit-capable passive optical network (GPON) according to a first embodiment of the present invention.

As shown in FIG. 5, in order to perform a GEM OAM operation in a GPON according to the teachings of the present invention, a GEM header proposed in an ITU-T G.984.3 draft may be used as a frame header, and an ATM OAM frame payload proposed in an ITU-T I.610 maybe used as a payload portion. That is, the OAM payload portion includes an OAM type field 502, a function type field 503, an OAM function specific field 504, and a CRC field 505.

In order to signify that a GEM frame is an OAM frame during a GEM mode transmitted to a specific ONT, a "Port_ID" field 506 of a header portion in the GEM frame 501 maybe used.

The usage protocol may be performed in two ways. In a first scheme, a part of the Port_ID field (12 bits) 506 is used in representing the OAM payload. In a second scheme, the Port_IDs of the ONU/ONT are newly defined respectively. For instance, the Port_IDs of the ONU/ONT are assigned as an A and B. Thus, when the Port_ID field designates the A, the corresponding payload is a typical GEM frame. When the Port_ID field designates the B, the corresponding payload represents an OAM frame. That is, the Port_IDs for the OAM are newly added to the Port_IDs to the ONU/ONT.

In operation, only the Port_ID is configured to signify that the GEM frame is the OAM frame in the GEM mode transmitted to a specific ONT. That is, different values are assigned to ONTs. In this regard, a step of assigning the Port_ID, which may represent an OAM frame of each ONT through a signaling between the OLT and the ONT at the initialization time point of a network, must be added. However, a step of assigning the Port_ID to the ONU/ONT has been already defined by the standard. Accordingly, in the embodiment of the present invention, it is necessary to assign the Port_ID using a method different from that defined in the existing standard, as described above.

Figure 6:
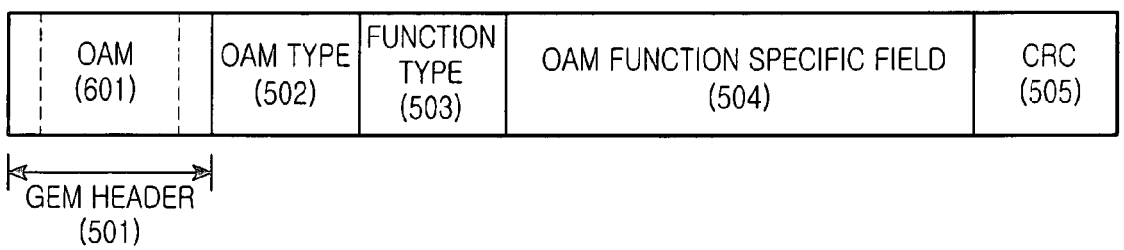
FIG. 6 is a diagram defining the structure of an OAM frame in a GEM mode of a GPON according to a second embodiment of the present invention.

FIG. 6 is a diagram defining the structure of an OAM frame in a GEM mode of a GPON according to a second embodiment of the present invention.

As shown in FIG. 6, in order to perform a GEM OAM operation in a GPON according to the teachings of the present invention, a GEM header proposed in an ITU-T G.984.3 draft may be used as a frame header, and an ATM OAM frame payload proposed in an ITU-T I.610 may be used as a payload portion. That is, the OAM payload portion includes an OAM type field 502, a function type field 503, an OAM function specific field 504, and a CRC field 505.

In order to signify that a GEM frame is an OAM frame in a GEM mode transmitted to a specific ONT, a new field is inserted into the header portion 501. In particular, an OAM frame field 601 is inserted. In other words, in a case of an OAM frame, a value of the OAM frame field 601 is activated so as to indicate that the OAM frame is a GEM OAM frame. In contrast, in a case of a conventional frame known in the art, the value of the OAM frame field 601 is deactivated.

Figure 7:
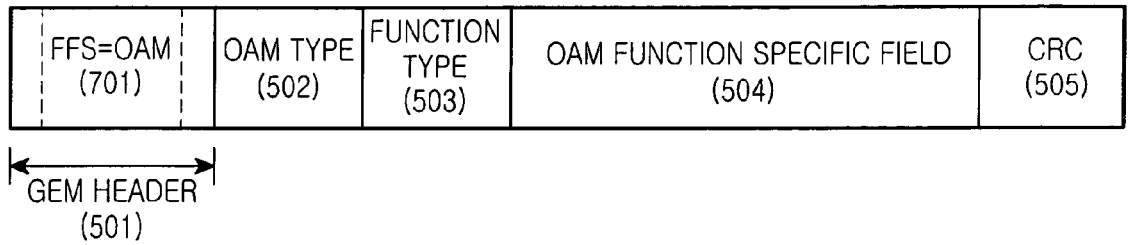
FIG. 7 is a diagram defining the structure of an OAM frame in a GEM mode of a GPON according to a third embodiment of the present invention.

FIG. 7 is a diagram defining the structure of an OAM frame in a GEM mode of a GPON according to a third embodiment of the present invention.

As shown in FIG. 7, in order to perform a GEM OAM operation in a GPON according to the teachings of the present invention, a GEM header proposed in an ITU-T G.984.3 draft may be used as a frame header, and an ATM OAM frame payload proposed in an ITU-T I.610 may be used as a payload portion. That is, the OAM payload portion includes an OAM type field 502, a function type field 503, an OAM function specific field 504, and a CRC field 505.

In order to signify that a GEM frame is an OAM frame in a GEM mode transmitted to a specific ONT, a field reserved in the header portion 501 is newly used. That is, the field, which is not used in a currently defined standard as reserved, is used as an OAM frame field, instead of adding the OAM frame field 601. In particular, an FFS field 701 is used as the OAM frame field.

Figure 8:
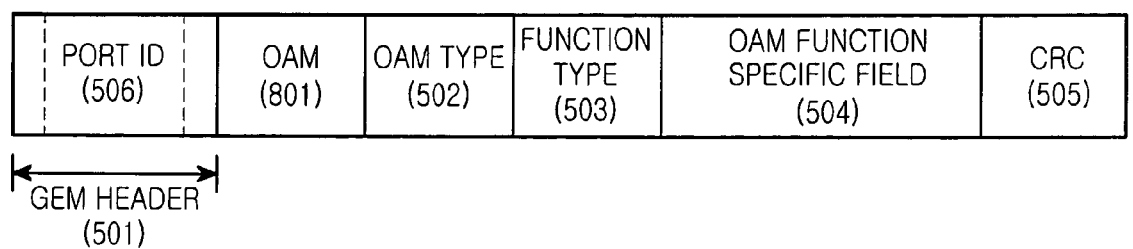
FIG. 8 is a diagram defining the structure of an OAM frame in a GEM mode of a GPON according to a fourth embodiment of the present invention.

FIG. 8 is a diagram defining the structure of an OAM frame in a GEM mode of a GPON according to a fourth embodiment of the present invention.

As shown in FIG. 8, in order to perform a GEM OAM operation in a GPON according to the teachings of the present invention, a GEM header proposed in an ITU-T G.984.3 draft may be used as a frame header, and an ATM OAM frame payload proposed in an ITU-T I.610 may be used as a payload portion. That is, the OAM payload portion includes an OAM type field 502, a function type field 503, an OAM function specific field 504, and a CRC field 505.

In order to represent a GEM OAM frame transmitted to a specific ONT, an OAM frame field 801 is newly defined in an OAM payload portion in the embodiment of the present invention. That is, a corresponding frame type is not defined in a header. Instead, the frame type is defined in a payload portion of a frame and then transmitted.

According to the present invention as described above, a GEM OAM frame in a GPON is defined, so that an OAM function can be performed in a GEM mode.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting Operation, Administration and Maintenance (OAM) information from an Optical Line Termination (OLT) to an Optical Network Unit/Optical Network Terminal (ONU/ONT) during a Gigabit-Capable Passive Optical Network (GPON) Encapsulation Method (GEM) mode in a Gigabit-capable passive optical network, the method comprising the steps of:

constructing a Gigabit-Capable Passive Optical Network (GPON) Encapsulation Method Operation, Administration and Maintenance (GEM OAM) frame having a GEM header field and a GEM payload field, the GEM header field containing OAM representation information indicating that the GEM OAM frame contains the OAM information, the GEM payload field containing the OAM information; and transmitting the constructed GEM OAM frame to enable the ONU/ONT to perform an operation according to the OAM information, wherein the GEM header field includes an OAM type field for representing types of the OAM information, a function type field for representing functions according to the OAM types, and an OAM function specific field for representing detailed operations according to the function types; and wherein a value of the OAM representation information is activated to indicate the GEM OAM frame and deactivated to indicate a conventional frame.

2. The method as claimed in claim 1, wherein the Gigabit-Capable Passive Optical Network (GPON) Encapsulation Method (GEM) header field includes a port ID field for differentiating traffics from each other in order to provide a traffic multiplexing for the GEM frame, and the port ID field includes predetermined bits for storing the Operation, Administration and Maintenance (OAM) representation information indicating that the Gigabit-Capable Passive Optical Network (GPON) Encapsulation Method Operation, Administration and Maintenance (GEM OAM) frame contains the OAM information.

3. The method as claimed in claim 1, wherein the Gigabit-Capable Passive Optical Network (GPON) Encapsulation Method (GEM) header field includes a port ID field for differentiating traffics from each other in order to provide a traffic multiplexing of the GEM frame, and a port value represented by the port ID field reports a destination of a specific Optical Network Unit/Optical Network Terminal (ONU/ONT) and indicates the frame containing the Operation, Administration and Maintenance (OAM) information.

4. The method as claimed in claim 1, wherein the Gigabit-Capable Passive Optical Network (GPON) Encapsulation Method (GEM) header field further comprises an Operation, Administration and Maintenance (OAM) frame field containing the OAM representation information indicating that the frame contains the OAM information.

5. The method as claimed in claim 1, wherein the Gigabit-Capable Passive Optical Network (GPON) Encapsulation Method (GEM) header field allows a field, which is reserved in the GEM header field, to be used as a field representing the Operation, Administration and Maintenance (OAM) representation information indicating that the frame contains the OAM information.

6. The method as claimed in claim 2, wherein the Gigabit-Capable Passive Optical Network (GPON) Encapsulation Method (GEM) payload field includes an Operation, Administration and Maintenance (OAM) type field for representing types of the OAM information, a function type field for representing functions according to the OAM types, and an OAM function specific field for representing detailed operations according to the function types.

7. The method as claimed in claim 3, wherein the Gigabit-Capable Passive Optical Network (GPON) Encapsulation Method (GEM) payload field includes an Operation, Administration and Maintenance (OAM) type field for representing types of the OAM information, a function type field for representing functions according to the OAM types, and an OAM function specific field for representing detailed operations according to the function types.

8. A method for transmitting Operation, Administration and Maintenance (OAM) information from an OLT to an Optical Network Unit/Optical Network Terminal (ONU/ONT) during a Gigabit-Capable Passive Optical Network (GPON) Encapsulation Method (GEM) mode in a Gigabit-capable passive optical network, the method comprising the steps of:

constructing a Gigabit-Capable Passive Optical Network (GPON) Encapsulation Method Operation, Administration and Maintenance (GEM OAM) frame having a Gigabit-Capable Passive Optical Network (GPON) Encapsulation Method header field and a Gigabit-Capable Passive Optical Network (GPON) Encapsulation Method payload field, the Gigabit-Capable Passive Optical Network (GPON) Encapsulation Method payload field containing Operation, Administration and Maintenance (OAM) representation information and the OAM information, the OAM representation information indicating that the Gigabit-Capable Passive Optical Network (GPON) Encapsulation Method Operation, Administration and Maintenance GEM OAM frame contains the OAM information; and transmitting the constructed Gigabit-Capable Passive Optical Network (GPON) Encapsulation Method Operation, Administration and Maintenance (GEM OAM) frame to enable the ONU/ONT to perform an operation according to the OAM information, wherein a value of the OAM representation information is activated to indicate that the Gigabit-Capable Passive Optical Network (GPON) Encapsulation Method Operation, Administration and Maintenance (GEM OAM) frame and deactivated to indicate a conventional frame.

9. A method for transmitting Operation, Administration and Maintenance (OAM) information from an Optical Network Unit/Optical Network Terminal (ONU/ONT) to an Optical Line Terminal (OLT) during a Gigabit-Capable Passive Optical Network (GPON) Encapsulation Method (GEM) mode in a Gigabit-capable passive optical network, the method comprising the steps of:

constructing a Gigabit-Capable Passive Optical Network (GPON) Encapsulation Method Operation, Administration and Maintenance (GEM OAM) frame having a Gigabit-Capable Passive Optical Network (GPON) Encapsulation Method header field and a GEM payload field, the Gigabit-Capable Passive Optical Network (GPON) Encapsulation Method header field containing OAM representation information indicating that the Gigabit-Capable Passive Optical Network (GPON) Encapsulation Method Operation, Administration and Maintenance (GEM OAM) frame contains the OAM information, the Gigabit-Capable Passive Optical Network (GPON) Encapsulation Method payload field containing the OAM information; and transmitting the constructed Gigabit-Capable Passive Optical Network (GPON) Encapsulation Method Operation, Administration and Maintenance GEM OAM frame to enable the OLT to perform an operation according to the OAM information, wherein a value of the OAM representation information is activated to indicate that the Gigabit-Capable Passive Optical Network (GPON) Encapsulation Method Operation, Administration and Maintenance (GEM OAM) frame and deactivated to indicate a conventional frame.

10. A method for transmitting Operation, Administration and Maintenance (OAM) information from an Optical Network Unit/Optical Network Terminal (ONU/ONT) to an Optical Line Terminal (OLT) during a Gigabit-Capable Passive Optical Network (GPON) Encapsulation Method (GEM) mode in a Gigabit-capable passive optical network, the method comprising the steps of:

constructing a Gigabit-Capable Passive Optical Network (GPON) Encapsulation Method Operation, Administration and Maintenance (GEM OAM) frame having a Gigabit-Capable Passive Optical Network (GPON) Encapsulation Method header field and a Gigabit-Capable Passive Optical Network (GPON) Encapsulation Method (GEM) payload field, the GEM payload field containing OAM representation information and the OAM information, the OAM representation information indicating that the Gigabit-Capable Passive Optical Network (GPON) Encapsulation Method Operation, Administration and Maintenance (GEM OAM) frame contains the OAM information; and transmitting the constructed Gigabit-Capable Passive Optical Network (GPON) Encapsulation Method Operation, Administration and Maintenance (GEM OAM) frame to enable the OLT to perform an operation according to the OAM information, wherein a value of the OAM representation information is activated to indicate that the Gigabit-Capable Passive Optical Network (GPON) Encapsulation Method Operation, Administration and Maintenance (GEM OAM) frame and deactivated to indicate a conventional frame.

11. A Gigabit Passive Optical Network (G-PON) communication system comprising:

an optical line termination (OLT);

an optical distribution network (ODN) in communication with the OLT;

a plurality of optical network units (ONUs) which receives downstream frames from the OLT via the ODN, and sends upstream data to the ODN for multiplexing and transmission to the OLT;

wherein at least one downstream frame comprises a Gigabit-Capable Passive Optical Network (GPON) Encapsulation Method Operation, Administration and Maintenance (GEM OAM) frame to enable the Optical Network Unit/Optical Network Terminal (ONU/ONT) to perform an operation according to Operation, Administration and Maintenance (OAM) information, said GEM OAM frame comprising a Gigabit-Capable Passive Optical Network (GPON) Encapsulation Method header field and a Gigabit-Capable Passive Optical Network (GPON) Encapsulation Method payload field, the GEM Gigabit-Capable Passive Optical Network (GPON) Encapsulation Method header field containing OAM representation information, and the Gigabit-Capable Passive Optical Network (GPON) Encapsulation Method payload field containing the OAM information; and wherein the Gigabit-Capable Passive Optical Network (GPON) Encapsulation Method header field includes a port ID field for differentiating traffics from each other in order to provide a traffic multiplexing for the Gigabit-Capable Passive Optical Network (GPON) Encapsulation Method frame, and the port ID field includes predetermined bits for storing the OAM representation information indicating that the Gigabit-Capable Passive Optical Network (GPON) Encapsulation Method Operation, Administration and Maintenance frame contains the OAM information.

12. A method for transmitting Operation, Administration and Maintenance (OAM) information from an Optical Line Terminal (OLT) to an Optical Network Unit/Optical Network Terminal (ONU/ONT) during a Gigabit-Capable Passive Optical Network (GPON) Encapsulation Method mode in a Gigabit-capable passive optical network, the method comprising the steps of:

constructing a Gigabit-Capable Passive Optical Network (GPON) Encapsulation Method Operation, Administration and Maintenance (GEM OAM) frame having a GEM Gigabit-Capable Passive Optical Network (GPON) Encapsulation Method (GEM) header field and a Gigabit-Capable Passive Optical Network (GPON) Encapsulation Method payload field, the Gigabit-Capable Passive Optical Network (GPON) Encapsulation Method header field containing OAM representation information indicating that the GEM OAM frame contains the OAM information, the Gigabit-Capable Passive Optical Network (GPON) Encapsulation Method payload field containing the OAM information; and transmitting the constructed GEM OAM frame to enable the ONU/ONT to perform an operation according to the OAM information, wherein the GEM header field includes a port ID field for differentiating traffics from each other in order to provide a traffic multiplexing for the GEM frame, and the port ID field includes predetermined bits for storing the OAM representation information indicating that the GEM OAM frame contains the OAM information.

13. The method as claimed in claim 12 wherein the Gigabit-Capable Passive Optical Network (GPON) Encapsulation Method (GEM) payload field includes an Operation, Administration and Maintenance (OAM) type field for representing types of the OAM information, a function type field for representing functions according to the OAM types, and an OAM function specific field for representing detailed operations according to the function types.

14. A method for transmitting Operation, Administration and Maintenance (OAM) information from an Optical Line Terminal (OLT) to an Optical Network Unit/Optical Network Terminal (ONU/ONT) during a Gigabit-Capable Passive Optical Network (GPON) Encapsulation Method (GEM) mode in a Gigabit-capable passive optical network, the method comprising the steps of:

constructing a Gigabit-Capable Passive Optical Network (GIPON) Encapsulation Method Operation, Administration and Maintenance (GEM OAM) frame having a GEM header field and a GEM payload field, the OEM header field containing OAM representation information indicating that the GEM OAM frame contains the OAM information, the GEM payload field containing the OAM information; and transmitting the constructed GEM OAM frame to enable the ONU/ONT to perform an operation according to the OAM information, wherein the GEM header field includes a port ID field for differentiating traffics from each other in order to provide a traffic multiplexing of the GEM frame, and a port value represented by the port ID field reports a destination of a specific ONU/ONT and indicates the frame containing the OAM information.

15. The method as claimed in claim 14, wherein the Gigabit-Capable Passive Optical Network (GPON) Encapsulation Method (GEM) payload field includes an Operation, Administration and Maintenance (OAM) type field for representing types of the OAM information, a function type field for representing functions according to the OAM types, and an OAM function specific field for representing detailed operations according to the function types.

* * * * *